United States Patent [19]

Hatakeyama et al.

[11] Patent Number: 5,804,287
[45] Date of Patent: Sep. 8, 1998

[54] ACRYLIC FILM-LAMINATED MOLDED ARTICLE AND ACRYLIC FILM

[75] Inventors: Hiroki Hatakeyama, Otake; Kazuhiko Nakagawa, Toyohashi; Tomonori Terasawa, Kawasaki, all of Japan

[73] Assignee: Mitsubishi Rayon Company, Ltd., Tokyo, Japan

[21] Appl. No.: 737,598

[22] PCT Filed: Mar. 28, 1996

[86] PCT No.: PCT/JP96/00836

§ 371 Date: Nov. 25, 1996

§ 102(e) Date: Nov. 25, 1996

[87] PCT Pub. No.: WO96/30435

PCT Pub. Date: Mar. 10, 1996

[30] Foreign Application Priority Data

Mar. 28, 1995  [JP]  Japan .................................. 7-069910
Mar. 28, 1995  [JP]  Japan .................................. 7-069912

[51] Int. Cl.$^6$ ................................ C08J 5/18; C08L 33/06
[52] U.S. Cl. .......................... 428/220; 428/201; 428/203; 428/205; 428/327; 428/332; 428/412; 428/517; 428/519; 428/520
[58] Field of Search ...................................... 428/201, 203, 428/205, 220, 327, 332, 412, 517, 519, 520

[56] References Cited

U.S. PATENT DOCUMENTS 5,409,778  4/1995  Patel ........................................ 428/412

*Primary Examiner*—D. S. Nakarani
*Attorney, Agent, or Firm*—Oblon, Spivak, McClelland, Maier & Neustadt, P.C.

[57] ABSTRACT

An acrylic film with a thickness of 300 μm or less for acrylic-laminated injection molded articles, which comprises 0–10 parts by weight of a thermoplastic polymer (I) consisting mainly of methyl methacrylate and having a reduced viscosity exceeding 0.2 L/g; 5.5–25 parts by weight of a rubber-containing polymer (II) which is a polymer wherein a monomer consisting mainly of a methacrylic acid ester is linked with an elastic copolymer consisting mainly of an alkyl acrylate, and which has a particle size of 0.2 μm–0.4 μm; and 65–94.5 parts by weight of a thermoplastic polymer (III) consisting mainly of a methacrylic acid ester and having a reduced viscosity of no greater than 0.1 L/g, wherein the total of the components (I), (II) and (III) is 100 parts by weight, and the proportion of the elastic copolymer in the rubber-containing polymer (II) is 5–18 wt % of the total of components (I), (II) and (III); as well as molded articles laminated with the acrylic film.

16 Claims, No Drawings

ACRYLIC FILM-LAMINATED MOLDED ARTICLE AND ACRYLIC FILM

TECHNICAL FIELD

The present invention relates to an acrylic-laminated injection molded article which is adhesively laminated with a specific acrylic film, and to an acrylic film used to produce the molded article.

BACKGROUND ART

Methods for creating decoration on the surfaces of plastic articles are largely classified as direct printing methods or transfer methods. Direct printing methods are used for direct printing of molded articles, and include pad printing, curved silk printing and electrostatic printing which, however, are unsuitable for producing molded articles with complex shapes and do not allow easy creation of elaborate designs. Transfer methods include the heat transfer method and water transfer method, but these have disadvantages of relatively high cost.

An additional method which allows creation of designs in molded articles at low cost is the in-mold method. This method involves first molding a sheet or film made of a printed polyester resin, polycarbonate resin or acrylic resin into a three-dimensional shape by vacuum molding or the like, or without molding if desired, and then inserting it into an injection mold and injection molding the resin which is to serve as the base material, in which case the resin sheet or film is sometimes integrated with the base resin and sometimes only the printing is transferred.

Acrylic films are used as surface protectors for polycarbonates and vinyl chloride because of their excellent transparency and weatherability. However, their thickness of 300 µm or less renders it difficult to form films unless they are flexible, and therefore low surface hardness has been a problem.

Japanese Unexamined Patent Publication No. 63-77963, for example, discloses an acrylic resin composition with excellent transparency, weatherability and film formability. However, the particle size of the rubber-containing polymer is not mentioned, while the particle sizes of the rubber-containing polymers obtained in the examples are 0.15 µm or smaller. Also, since the amount of rubber-containing polymer added is substantially 28% or greater, its surface hardness is inferior.

Using polyester resins or polycarbonate resins for in-mold decorating wherein only the print is transferred results in drawbacks such as a lack of high quality feel and depth of the appearance, as well as insufficient weatherability.

Problems of higher cost are associated with providing appearances having depth and high quality on the surfaces of molded articles designed by these processes, and with processes involving painting steps. Efforts are also being made to improve the poor workability in painting steps which handle large volumes of solvents.

Painting requires the skill of trained workers, and satisfactory surface appearances with depth and high quality can only be obtained by repeated application from a few times to as many as 20 to 30 times, which thus greatly increases costs and reduces productivity.

In recent years, painting steps involving the use of large volumes of organic solvents have become problematic from the viewpoint of improving the working environment.

On the other hand, although molded articles laminated by in-mold decorating of acrylic films have excellent depth and quality appearance similar to painted molded articles, acrylic films generally have inadequate surface hardness and heat resistance, are very prone to damage once molded, and acquire a poor surface appearance when exposed to high temperatures.

DISCLOSURE OF INVENTION

As a result of diligent research conducted with the aim of overcoming the problems described above, the present inventors have completed the present invention upon the finding that acrylic films with excellent surface hardness may be obtained by using a rubber-containing polymer with a specific particle size which is larger than that of rubber-containing polymers used for conventional acrylic films, and in a smaller amount than conventionally used.

In other words, the gist of the present invention lies in an acrylic resin film with a thickness of 300 µm or less comprising 0–10 parts by weight of a thermoplastic polymer (I), 5.5–25 parts by weight of a rubber-containing polymer (II) and 65–94.5 parts by weight of a thermoplastic polymer (III), wherein the total of the components (I), (II) and (III) is 100 parts by weight, and the proportion of elastic copolymer in the rubber-containing polymer (II) is 5–18 wt % of the total of components (I), (II) and (III), as well as an acrylic-laminated injection molded article which is adhesively laminated with the film.

The acrylic film of the invention can be obtained with satisfactory transparency at a small thickness of 300 µm or less, and since no crosslinking or other procedures are performed as a means of achieving higher surface hardness, the film has excellent formability or second stage processability for drawing, bending, etc., and is thus highly suitable for the production of acrylic-laminated injection molded articles.

BEST MODE FOR CARRYING OUT THE INVENTION

The thermoplastic polymer (I) used according to the invention is obtained by polymerizing 50–100 wt % of methyl methacrylate and 0–50 wt % of at least one other vinyl monomer which is copolymerizable therewith, and it is a thermoplastic polymer with a reduced viscosity (measured with 0.1 g of the polymer dissolved in 100 mL of chloroform, at 25° C.) exceeding 0.2 L/g, as a component for providing satisfactory film formability. Though a film can be formed even without using the thermoplastic polymer (I), the reduced melt tension makes it impossible to form a film unless the discharge volume and resin temperature are lowered during film formation, and since this impedes productivity and leads to more irregularity in the film thickness, use of this polymer is preferred.

The reduced viscosity of the thermoplastic polymer (I) is important, because if it is 0.2 L/g or below the film will not have satisfactory thickness precision. The reduced viscosity of the thermoplastic polymer (I) used is normally higher than 0.2 L/g but not higher than 2 L/g, but preferably 1.2 L/g or lower.

The vinyl-based monomer which is copolymerizable with methyl methacrylate in the thermoplastic polymer (I) used according to the invention may be an alkyl acrylate, alkyl methacrylate, aromatic vinyl compound or vinyl cyan compound. The polymerization is preferably accomplished by emulsion polymerization, and a common method of emulsion polymerization followed by post-treatment may be used to obtain the polymer in a powder form.

The rubber-containing polymer (II) used according to the invention has the effect of imparting excellent impact resistance and elongation to the resin composition, and it is a graft copolymer with a multilayer structure containing an alkyl acrylate as the major component.

The rubber-containing polymer (II) used according to the invention is obtained by first producing an elastic copolymer by polymerization of a monomer mixture comprising 50–99.9 wt % of the alkyl acrylate, 0–49.9 wt % of another copolymerizable vinyl-based monomer and 0.1–10 wt % of a copolymerizable crosslinkable monomer, followed by polymerization of 10–400 parts by weight of a monomer or monomer mixture comprising 50–100 wt % of a methacrylic acid ester and 0–50 wt % of a vinyl-based monomer which is copolymerizable therewith, in one or more stages, in the presence of 100 parts by weight of the obtained elastic copolymer.

The alkyl acrylate used here may be one with an alkyl group of 1–8 carbon atoms, of which butyl acrylate and 2-ethylhexyl acrylate are preferred. To obtain the elastic copolymer, 49.9 wt % or less of another copolymerizable vinyl monomer may be copolymerized therewith. The vinyl monomer used here is preferably an alkyl methacrylate such as methyl methacrylate, butyl methacrylate or cyclohexyl methacrylate, or styrene, acrylonitrile, etc. According to the invention, a copolymerizable crosslinkable monomer may also be used. The crosslinkable monomer used is not particularly restricted, but is preferably ethylene glycol dimethacrylate, butanediol dimethacrylate, allyl acrylate, allyl methacrylate, diallyl phthalate, triallyl cyanurate, triallyl isocyanurate, divinyl benzene, diallyl maleate, trimethylol triacrylate or allyl cinnamate, which may be used either alone or in combinations of 2 or more.

The monomer grafted to the elastic copolymer may be 50 wt % or more of a methacrylic acid ester, of which specific examples include methyl methacrylate, ethyl methacrylate, butyl methacrylate, 2-ethylhexyl methacrylate and cyclohexyl methacrylate. In addition, 50 wt % or less of a copolymerizable vinyl-based monomer may also be used, in which case it is not particularly restricted, and alkyl acrylates such as methyl acrylate, butyl acrylate or cyclohexyl acrylate, and styrene, acrylonitrile, etc. are specific examples. A monomer mixture for grafting may be used at 10–400 parts by weight, and preferably 20–200 parts by weight with respect to 100 parts by weight of the elastic copolymer, and it may be polymerized in one or more stages. The monomer mixture for grafting is preferably not in an amount of less than 10 parts by weight to 100 parts by weight of the elastic copolymer, since this results in poor transparency due to aggregation of the elastic copolymer.

The rubber-containing polymer (II) used according to the invention has a particle size of 0.2–0.4 μm, and preferably 0.25–0.35 μm. The rubber-containing polymer (II) is also usually obtained by emulsion polymerization. A particle size of less than 0.2 μm results in a brittle film using the amount of the rubber-containing polymer (II) according to the invention, thus making film formation impossible. A particle size exceeding 0.4 μm impairs the transparency of the resulting film.

The thermoplastic polymer (III) used according to the invention is obtained by polymerizing 50–100 wt % of a methacrylic acid ester with an alkyl group of 1–4 carbon atoms, 0–50 wt % of an acrylic acid ester, and 0–49 wt % of at least one other vinyl monomer which is copolymerizable therewith, and it is a polymer with a reduced viscosity (measured with 0.1 g of the polymer dissolved in 100 mL of chloroform, at 25° C.) of no greater than 0.1 L/g. If the reduced viscosity of the thermoplastic polymer (III) exceeds 0.1 L/g, the melt viscosity of the resin material of the film becomes too high, resulting in poor film formability. The reduced viscosity of the thermoplastic polymer (III) is preferably at least 0.05 L/g. When the reduced viscosity is lower than 0.05 L/g, the film becomes too brittle and tends to tear during film formation and printing.

The methacrylic acid ester used for the thermoplastic polymer (III) may be methyl methacrylate, ethyl methacrylate, butyl methacrylate, etc., with methyl methacrylate being preferred. The acrylic acid ester may be methyl acrylate, ethyl acrylate, butyl acrylate, etc. The acrylic acid ester is used in an amount in the range of 0–50 wt %, and preferably 0.1–40 wt %. The other copolymerizable vinyl monomer may be any known monomer.

The polymerization of the thermoplastic polymer (III) is not particularly restricted, and may be accomplished by commonly employed suspension polymerization, emulsion polymerization or bulk polymerization. A chain transfer agent may be necessary in order to keep the viscosity within the range specified according to the invention. Any publicly known chain transfer agent may be used, with mercaptanes being preferred. The amount of the chain transfer agent must be appropriately determined depending on the type and composition of the monomers.

The acrylic film of the invention is a film comprising either a thermoplastic polymer (I) obtained in the manner described above, a rubber-containing polymer (II) and a thermoplastic polymer (III), or a rubber-containing polymer (II) and a thermoplastic polymer (III).

According to the invention, the thermoplastic polymer (I) is used in an amount of 0–10 parts by weight. A film can be formed even without the thermoplastic polymer (I), but for adequate film formability it is preferably used in an amount of at least 0.1 part by weight. When used at greater than 10 parts by weight the viscosity of the resin composition becomes too high, thus resulting in poor film formability and poor transparency.

The rubber-containing polymer (II) is used in an amount of 5.5–25 parts by weight, and in particular the proportion of elastic copolymer in the rubber-containing polymer (II) must be 5–18 wt % with respect to the total of polymers (I), (II) and (III). When the proportion of the elastic copolymer is less than 5 wt %, the film becomes brittle, making film formation impossible. When the proportion of the elastic copolymer exceeds 18 wt %, the transparency of the film is impaired, and the surface hardness is lowered.

The acrylic film of the invention may also contain, as necessary, commonly used additives such as stabilizers, lubricants, processing aids, plasticizers, impact resistance aids, foaming agents, fillers, coloring agents, flatting agents, ultraviolet absorbers and the like. From the standpoint of protecting the substrate material, addition of an ultraviolet absorber is particularly preferred to provide weatherability. The molecular weight of the ultraviolet absorber used is preferably at least 300, and more preferably at least 400. When the ultraviolet absorber used has a molecular weight of under 300 it may volatilize during vacuum molding or air-pressure molding in the injection mold, polluting the mold. The type of ultraviolet absorber is not particularly restricted, and benzotriazole-based absorbers with molecular weights of at least 400 and triazine-based absorbers with molecular weights of at least 400 are preferably used, with examples of the former including Tinuvin 234 by Ciba-Geigy Co. and Adekastab LA031 by Asahi Denka Kogyo Co. and examples of the latter including Tinuvin 1577 by Ciba-Geigy Co.

The deflection temperature of the acrylic film of the invention (as measured based on ASTM D648) is preferably 80° C. or higher. If the deflection temperature is lower than 80° C., surface roughness will occur as a result of residual stress during heating of the acrylic laminated molded article. When used for vehicles, the deflection temperature is preferably over 100° C. as this will enable its use around areas of the handle, and more preferably over 110° C. to enable its use around meter panel sections.

The deflection temperature of the acrylic film of the invention may vary depending on the amount of the rubber-containing polymer (II) used, but it usually depends on the deflection temperature of the thermoplastic polymer (III) used for the invention. The deflection temperature of the thermoplastic polymer (III) may be adjusted by modifying the monomer composition of the thermoplastic polymer (III) by a known method. Although there are various adjusting conditions, for example when methyl acrylate is used as a copolymerizing component, the methyl methacrylate content of the thermoplastic polymer (III) may be adjusted to 88 wt % or greater for a deflection temperature of 80° C. or higher, and the methyl methacrylate content of the thermoplastic polymer (III) may be adjusted to 95 wt % or greater for a deflection temperature of 100° C. or higher. For deflection temperatures of 110° C. and higher it is necessary to copolymerize maleic anhydride or phenyl maleimide and other maleimides in the thermoplastic polymer (III). Of course, for deflection temperatures of 80° C. and higher or 100° C. and higher as well, maleic anhydride or phenyl maleimide and other maleimides may be copolymerized, with corresponding reduction in the methyl methacrylate content.

The method used to produce the acrylic film of the invention may be the melt casting method or a melt extrusion method such as the T-die method or inflation method, a calender method or any other method, but the T-die method is preferred from an economic standpoint.

Acrylic films used in place of paints may be usually printed by a suitable printing method as necessary to provide a design in the molded article. In such cases, the acrylic film is preferably subjected to one-sided printing, and the printing surface is preferably oriented toward the base resin-adhering side during molding for protection and a high quality impression of the printing surface. It may also be used in transparent form if the object is to enhance the color tone of a plastic base material in place of transparent paint. Acrylic films are particularly superior to vinyl chloride and polyester films in terms of transparency, depth and high quality appearance, for such uses as enhancing the color tone of base materials.

The film may also be used after flatting or coloring treatment if necessary.

The thickness of the acrylic film is 300 μm or less, and preferably from 100 μm–300 μm. A thickness of less than 100 μm will not give sufficient depth to the appearance of the molded article. It also becomes particularly difficult to achieve sufficient thickness by drawing when complex shapes are to be formed. A thickness of greater than 300 μm, on the other hand, results in greater rigidity, thus impairing the laminatability and formability and rendering the film unusable, while it is also undesirable from a cost standpoint since the weight per unit area is increased; hence, film formation is hampered and a stable film cannot be produced. Since the thickness of not more than 300 μm makes it impossible to utilize means commonly used in the production of acrylic sheets such as nipping with metal rolls and transfer printing of the surface to improve transparency because the spacing between metal rolls is too narrow, it therefore becomes necessary to use the specified amount of the rubber-containing polymer having the particle size as specified according to the invention.

Formation of a coated film of sufficient thickness by painting or coating the molded article requires dozens of overcoatings, which is costly and results in extremely poor productivity; in contrast, the acrylic-laminated molded article of the invention uses the acrylic film itself as the coating, making it easy to form a very thick coating in an industrially advantageous manner.

The resin which serves as the base material composing the injection molded article of the invention must be melt-adherable with the acrylic film, such as an ABS resin, AS resin, styrene resin, polycarbonate resin, vinyl chloride resin, acrylic resin, polyester-based resin or a resin composed mainly thereof, but preferred for adhesion are ABS resins, AS resins, polycarbonate resins, vinyl chloride resins and resins composed mainly of those resins, and more preferred are ABS resins, polycarbonate resins and resins composed mainly of those resins.

A method for producing the molded article of the invention will now be explained.

After heating of the acrylic film, it is vacuum molded in an a mold equipped with an evacuation function. Since the shaping of the film and the injection molding are accomplished in a single step in this process, it is preferred from the standpoint of both workability and economy. The heating temperature is preferably at or above the temperature at which the acrylic film softens. This temperature depends on the thermal characteristics of the film and the shape of the molded article, but is usually 70° C. or higher. However, a temperature which is too high results in an impaired surface appearance and poor release characteristics. This also depends on the thermal characteristics of the film and the shape of the molded article, but the temperature is usually preferred to be no higher than 170° C.

When the film is given a three-dimensional shape by vacuum molding in this manner, the acrylic film has greater elongation at high temperatures, and is thus highly useful.

After creating the three-dimensional shape by vacuum molding, the acrylic film and base resin are melt-integrated by extrusion molding.

The present invention will now be explained in more detail by way of the following examples, which are not intended to restrict the invention. Throughout the examples, "parts" refers to "parts by weight", and "%" refers to "percent by weight". The abbreviations used in the examples are the following.

| | |
|---|---|
| Methyl methacrylate | MMA |
| Methyl acrylate | MA |
| Butyl acrylate | BuA |
| 1,3-butyleneglycol dimethacrylate | BD |
| Allyl methacrylate | AMA |
| Styrene | St |
| Ethyl acrylate | EA |
| Cyclohexyl maleimide | CHMI |
| Cumene hydroperoxide | CHP |
| n-Octyl mercaptane | NOM |

The obtained thermoplastic polymers (I) and (III), the rubber-containing polymer (II) and the film were tested for various properties by the methods described below.

1) Reduced viscosity of thermoplastic polymers (I) and (III)

A 0.1 g portion of the polymer was dissolved in 100 mL of chloroform and measured at 25° C.

2) Particle size of rubber-containing polymer (II)

The final particle size of a polymer latex of the rubber-containing polymer (II) obtained by emulsion polymerization was measured by the dynamic light scattering method using a DLS-700 light-scattering photometer manufactured by Otsuka Denshi, KK.

3) Total light transmittance and haze of film

This was evaluated in accordance with JIS K6714.

4) Surface luster of film

The film surface luster was measured at 60° using a gloss meter (model GM-26D, product of Murakami Color Research Laboratory).

5) Pencil hardness of molded article

This was evaluated in accordance with JIS K5400.

6) Formability of film

Films were formed to a 100 p thickness by the T-die method, and those films which could be formed without tearing for 5 hours or more were indicated with "○", those films which underwent breakage a few times during the 5 hours were indicated with "Δ", and those which could not give samples due to the film breakage were indicated with "x".

7) Adhesion of film

The adhesive strength of the film and extrusion-molded resin with the in-mold decorated article was evaluated by the peeling test in accordance with JIS K5400, indicating those having no peeling with "○" and those having even a little peeling with "x".

8) Deflection temperature of film composition

A pellet of the film composition was formed into a deflection temperature measuring specimen by extrusion molding according to ASTM D648, and after annealing at 80° C. for 24 hours, it was measured according to ASTM D648 under a light load (4.6 kg/cm$^2$).

9) Molded article heating test

In-mold decorated articles were heated in a furnace at 80° C., 100° C. and 110° C. for 24 hours, and those which, after cooling, had smooth film-laminated sides with no change from prior to heating were indicated with "○"while those with surface roughness were indicated with "x".

10) Weatherability of in-mold decorated article

An Eye-Super UV tester (metal halide lamp-type, product of Dainippon Plastics Co.) was used for irradiation of the film laminated surface with ultraviolet rays at an intensity of 100 mw/cm$^2$, and the change in color was measured.

EXAMPLES 1, 2, 5, 6, 10, 11, 14, 19 AND COMPARATIVE EXAMPLES 1, 3–5 a) Production of thermoplastic polymer (I)

A reactor was charged with 200 parts of nitrogen-substituted deionized water, and then with 1 part of potassium oleate and 0.3 part of potassium persulfate as emulsifying agents. This was followed by charging of 40 parts of MMA, 10 parts of BuA and 0.005 part of NOM, and stirring for 3 hours at 65° C. under a nitrogen atmosphere to complete polymerization. Next, a monomer mixture comprising 48 parts of MMA and 2 parts of BuA was added dropwise over 2 hours, after which the mixture was allowed to stand for 2 hours to complete polymerization. The resulting latex was added to a 0.25% aqueous sulfuric acid solution, and upon acid flocculation of the polymer, it was dewatered, washed and dried, and the polymer was recovered in powder form. The reduced viscosity ηsp/c of the resulting copolymer was 0.38 L/g.

b) Production of Rubber-Containing Polymer (II)

A reactor was charged with raw materials consisting of the following raw material (a) and a half amount of the raw material (b), and polymerization was conducted while stirring for 90 minutes at 80° C. in a nitrogen atmosphere. The remaining half of raw material (b) was then added gradually over a period of 90 minutes, and this was followed by further polymerization for 120 minutes to obtain an elastic body latex.

The following raw material (c) was then added to the resulting elastic body latex, and after stirring the following raw material (d) was added gradually over a period of 45 minutes at 80° C., after which polymerization was continued for another hour at 80° C. to obtain the rubber-containing polymer (II) latex. The particle size of the resulting rubber-containing polymer (II) was 0.29 μm.

The rubber-containing polymer (II) latex was subjected to flocculation, aggregation and solidification reaction using calcium chloride, and after filtering, washing and drying the rubber-containing polymer (II) was obtained.

| (a) | |
|---|---|
| Deionized water | 300 parts |
| N-acylsarcosinic acid | 0.5 part |
| Boric acid | 1.0 part |
| Sodium carbonate | 0.1 part |
| Sodium formaldehyde sulfoxylate | 0.5 part |
| Ferrous sulfate | 0.00024 part |
| Disodium ethylenediamine tetracetate | 0.00071 part |
| (b) | |
| BuA | 80.0 parts |
| St | 19.0 parts |
| AMA | 1.0 part |
| CHP | 0.3 part |
| (c) | |
| Deionized water | 5 parts |
| N-acylsarcosinic acid | 1.2 parts |
| (d) | |
| MMA | 76.6 parts |
| EA | 3.2 parts |
| NOM | 0.28 part |
| CHP | 0.24 part | c) Production of Acrylic Film

The thermoplastic polymer (I) and rubber-containing polymer (II) obtained as described above were mixed with the thermoplastic polymer (III), methyl methacrylate/methyl acrylate copolymer A (methyl methacrylate/methyl acrylate=98/2, reduced viscosity: 0.06 L/g) in the proportions listed in Table 1 using a Henschel mixer. A 40 mmφ screw-type extruder (L/D=26) was then used for melt kneading at a cylinder temperature of 200° C.–260° C. and a die temperature of 250° C. into pellets to obtain a film composition.

The resulting pellets were dried for a day and a night at 80° C., and then a 40 mmφ non-bent screw extruder (L/D=26) equipped with a 300 mm T-die was used to prepare films with the various thicknesses listed in Table 2 at a cylinder temperature of 200° C.–240° C. and a T-die temperature of 250° C.

The obtained acrylic films with various thicknesses were subjected to printing followed by heating for one minute at 140° C. and then vacuum molding in a mold equipped with an evacuation function. The molded films were then subjected to injection molding with the ABS resins listed in Table 3 with the printed sides facing the molds, to obtain molded articles.

As mentioned above, the formability was judged by forming films to a thickness of 100 μm.

The formabilities of the obtained films are shown in Table 1, and the evaluation results including the film characteristics, surface hardness of the molded articles and adhesion, etc. are shown in Table 2.

Example 6 demonstrates that a small film thickness results in a poorer color depth and a lack of high quality impression.

Since no thermoplastic polymer (I) is used in Example 19, the formability was so poor that no film could be formed without lowering the T-die temperature by 10° C. Also, because of considerable irregularity in the thickness, the resulting molded product lacked a certain degree of high quality impression.

Comparative Example 1 demonstrates that when the amount of the rubber-containing polymer (II) used is less than 5.5 parts, the formability is impaired.

Comparative Example 3 demonstrates that when the thermoplastic polymer (I) is used in an amount exceeding 10 parts, the transparency is impaired.

Comparative Example 4 demonstrates that when no thermoplastic polymer (III) is used, the melt viscosity increases, thus impairing the film formability.

Comparative Example 5 demonstrates that when the amount of the rubber-containing polymer (II) used exceeds 25 parts, or the proportion of the elastic copolymer with respect to the total is greater than 18%, the transparency and surface hardness are impaired.

EXAMPLES 3, 4, 7–9, 12, 13

In-mold decorated articles were obtained in the same manner as Example 2, except that the resins used for injection molding were changed to the resins listed in Table 3. However, when the polycarbonate resin was used the film was not subjected to printing. Table 2 gives the results of evaluating the surface hardness, adhesion, etc. of the resulting molded articles.

All of the molded articles obtained were satisfactory in terms of appearance, but those in which PP, PPE or PA were used as the injection molding resins lacked film adhesion.

EXAMPLES 15, 16 AND COMPARATIVE EXAMPLES 2, 6

Polymerization was performed in the same manner as Example 2, except that for production of the rubber-containing polymer (II), the amounts of N-acylsarcosinic acid in raw material (a) were changed to those listed in Table 4. The particle sizes of the resulting rubber-containing polymers (II) are listed in Table 4. The rubber-containing polymers (II) were used as in Example 2 for mixture with the thermoplastic polymers (I) and (III), preparation of pellets, formation of films, printing and vacuum molding, after which the ABS resin was subjected to in-mold decorating with the films. The formabilities of the resulting films and characteristics of the molded articles are shown in Tables 1 and 2, respectively.

Comparative Example 2 demonstrates that when the particle size of the rubber-containing polymer (II) is less than 0.2 μm, the film formability is poor due to a lack of film strength, even if the amount of the rubber-containing polymer (II) is within the range specified according to the invention, while Comparative Example 6 demonstrates that when the amount of the rubber-containing polymer (II) is greater than specified according to the invention, the film formability and transparency are satisfactory, but the surface hardness is extremely poor.

EXAMPLES 17, 18

Polymerization was performed in the same manner as Example 1, except that for production of the rubber-containing polymer (II), the raw material (e) listed below was used instead of raw material (d). The particle size of the resulting rubber-containing polymer (II) was 0.26 μm. The rubber-containing polymer (II) was used as in Example 2 for mixture with the thermoplastic polymers (I) and (III), preparation of pellets, formation of films, printing and vacuum molding, after which the ABS resin was subjected to in-mold decorating with the film. The formabilities of the resulting films and characteristics of the molded articles are shown in Tables 1 and 2, respectively.

| (e) | |
|---|---|
| MMA | 38.4 parts |
| EA | 1.6 parts |
| NOM | 0.14 part |
| CHP | 0.12 part |

EXAMPLES 20–23

In-mold decorated articles were obtained in the same manner as Example 2, except that the thermoplastic polymer (III) was replaced with the ones listed in Table 5. However, with the thermoplastic polymer (III) used in Example 23 which had a reduced viscosity of 0.04 L/g, the resulting film was brittle and tore during printing, rendering it impossible to form a film, and thus no in-molding was performed. This demonstrates, as mentioned above, that a reduced viscosity of the thermoplastic polymer (III) which is not at least 0.05 L/g results in a brittle film, poor formability, and film tears during printing. The formabilities of the resulting films and characteristics of the molded articles are shown in Tables 1 and 2, respectively.

The results of the heating test on the obtained molded articles are shown in Table 6 along with the results from Example 2. These show that the deflection temperature under a light load and the surface irregularities upon heating are in approximate correspondence.

EXAMPLES 24–27

The various ultraviolet absorbers listed below were added to the film composition 1 used in Example 1, etc., to obtain in-mold decorated articles in the same manner as Example 3.

Tinuvin P benzotriazole-based ultraviolet absorber manufactured by Ciba-Geigy Co., molecular weight: 225

Tinuvin 234 benzotriazole-based ultraviolet absorber manufactured by Ciba-Geigy Co., molecular weight: 448

Tinuvin 1577 triazine-based ultraviolet absorber manufactured by Ciba-Geigy Co., molecular weight: 425

Uvinal 408 benzophenone-based ultraviolet absorber manufactured by BASF Co., molecular weight: 326

The formabilities of the resulting films and characteristics of the molded articles are shown in Tables 1 and 2, respectively.

In Example 24 where Tinuvin P was used, mold contamination by the Tinuvin P occurred during the injection molding, which resulted in impaired quality of appearance. With the other three ultraviolet absorbers, no mold contamination occurred, demonstrating that the molecular weight of the ultraviolet absorber is significant.

The results of weatherability testing of the obtained molded articles are shown in Table 7 along with the results from Example 3. These show that the benzophenone-based ultraviolet absorber cannot confer sufficient weatherability to the acrylic film of the invention.

It was attempted to form 500 μm-thick films using the film compositions, but none of them allowed stable film formation.

Industrial Applicability

According to the present invention there may be obtained injection molded articles having coating films of sufficient thickness which may be easily and economically formed, and having surface appearances with excellent high quality impression and depth.

TABLE 1

| Film composition | Amt of thermoplastic polymer (I) (pts) | Rubber-containing polymer (II) Particle size (μm) | Rubber-containing polymer (II) Amt (pts) | Thermoplastic polymer (III) Type | Thermoplastic polymer (III) Amt (pts) | Elastic copolymer content (%) | Other additives Type | Other additives Amt (pts) | Deflection temp (°C.) | Film formability |
|---|---|---|---|---|---|---|---|---|---|---|
| 1 | 2 | 0.29 | 18 | A | 80 | 10 | none | | 105 | o |
| 2 | 2 | 0.29 | 9 | A | 89 | 5 | none | | 108 | o |
| 3 | 2 | 0.35 | 18 | A | 80 | 10 | none | | 106 | o |
| 4 | 2 | 0.25 | 18 | A | 80 | 10 | none | | 104 | o |
| 5 | 2 | 0.26 | 7 | A | 91 | 5 | none | | 107 | o |
| 6 | 2 | 0.26 | 25 | A | 73 | 18 | none | | 98 | o |
| 7 | 2 | 0.29 | 36 | A | 62 | 20 | none | | 84 | o |
| 8 | 2 | 0.12 | 36 | A | 62 | 20 | none | | 82 | o |
| 9 | 0 | 0.29 | 18 | A | 82 | 10 | none | | 105 | Δ |
| 10 | 2 | 0.29 | 18 | B | 80 | 10 | none | | 91 | o |
| 11 | 2 | 0.29 | 18 | C | 80 | 10 | none | | 112 | o |
| 12 | 2 | 0.29 | 18 | D | 80 | 10 | none | | 75 | o |
| 13 | 2 | 0.29 | 18 | E | 80 | 10 | none | | 101 | Δ |
| 14 | 2 | 0.29 | 18 | A | 80 | 10 | Tinuvin P | 2 | 103 | o |
| 15 | 2 | 0.29 | 18 | A | 80 | 10 | Tinuvin 234 | 2 | 105 | o |
| 16 | 2 | 0.29 | 18 | A | 80 | 10 | Tinuvin 1577 | 2 | 106 | o |
| 17 | 2 | 0.29 | 18 | A | 80 | 10 | Uvinal 408 | 2 | 106 | o |
| Comp. Ex. 1 | 2 | 0.29 | 4 | A | 94 | 2 | none | | 110 | x |
| Comp. Ex. 2 | 2 | 0.12 | 18 | A | 80 | 10 | none | | 104 | x |
| Comp. Ex. 3 | 12 | 0.29 | 18 | A | 70 | 10 | none | | 91 | x |
| Comp. Ex. 4 | 82 | 0.29 | 18 | | 0 | 10 | none | | | x |

TABLE 2

| | Film composition | Thickness (μm) | Total light transmittance (%) | Haze (%) | Surface luster (%) | Injection molding resin | Pencil hardness | Adhesion | High quality feel |
|---|---|---|---|---|---|---|---|---|---|
| Example 1 | 1 | 100 | 92.5 | 0.7 | 143 | ABS | 2H | o | o |
| Example 2 | 1 | 200 | 9.25 | 0.6 | 150 | ABS | 2H | o | o |
| Example 3 | 1 | 200 | 92.5 | 0.6 | 150 | PC | 2H | o | o |
| Example 4 | 1 | 200 | 92.5 | 0.6 | 150 | ABS/PC | 2H | o | o |
| Example 5 | 1 | 300 | 92.5 | 0.5 | 152 | ABS | 2H | o | o |
| Example 6 | 1 | 50 | 92.5 | 1.0 | 140 | ABS | H | o | x |
| Example 7 | 1 | 200 | 92.5 | 0.6 | 150 | PP | 2H | x | o |
| Example 8 | 1 | 200 | 92.5 | 0.6 | 150 | PPE | 2H | x | o |
| Example 9 | 1 | 200 | 92.5 | 0.6 | 150 | PA | 2H | x | o |
| Example 10 | 2 | 100 | 92.6 | 0.7 | 146 | ABS | 2H | o | o |
| Example 11 | 2 | 200 | 92.6 | 0.6 | 150 | ABS | 2H | o | o |
| Example 12 | 2 | 200 | 92.6 | 0.6 | 150 | PC | 2H | o | o |
| Example 13 | 2 | 200 | 92.6 | 0.6 | 150 | ABS/PC | 2H | o | o |
| Example 14 | 2 | 300 | 92.6 | 0.5 | 152 | ABS | 2H | o | ⊙ |
| Example 15 | 3 | 200 | 92.5 | 0.7 | 148 | ABS | 2H | o | o |
| Example 16 | 4 | 200 | 92.5 | 0.6 | 150 | ABS | 2H | o | o |
| Example 17 | 5 | 200 | 92.7 | 0.6 | 150 | ABS | 2H | o | o |
| Example 18 | 6 | 200 | 92.5 | 1.1 | 141 | ABS | H | o | o |
| Example 19 | 9 | 200 | 92.7 | 0.5 | 153 | ABS | 2H | o | Δ |
| Example 20 | 10 | 200 | 92.7 | 0.5 | 152 | ABS | 2H | o | o |
| Example 21 | 11 | 200 | 92.3 | 1.0 | 142 | ABS | 2H | o | o |
| Example 22 | 12 | 200 | 92.6 | 0.6 | 151 | ABS | 2H | o | o |
| Example 23 | 13 | 200 | 92.2 | 1.2 | 139 | | | | |
| Example 24 | 14 | 200 | 92.5 | 0.7 | 150 | PC | 2H | o | Δ |
| Example 25 | 15 | 200 | 92.5 | 0.6 | 151 | PC | 2H | o | o |
| Example 26 | 16 | 200 | 92.5 | 0.6 | 150 | PC | 2H | o | o |
| Example 27 | 17 | 200 | 92.4 | 0.7 | 150 | PC | 2H | o | o |

TABLE 2-continued

Film evaluation results

| | Film composition | Thickness (μm) | Total light transmittance (%) | Haze (%) | Surface luster (%) | Injection molding resin | Pencil hardness | Adhesion | High quality feel |
|---|---|---|---|---|---|---|---|---|---|
| Comp. Ex. 5 | 7 | 200 | 92.4 | 2.4 | 127 | ABS | B | ○ | ○ |
| Comp. Ex. 6 | 8 | 200 | 92.6 | 0.6 | 150 | ABS | B | ○ | ○ |

TABLE 3

| Abbrev. | Resin type | Manufacturer | Product name |
|---|---|---|---|
| ABS | ABS resin | Mitsubishi Rayon | Diapet ABS Bulksam TM20 |
| PC | Polycarbonate resin | Mitsubishi Gas Chemical | Iupiron S100 |
| ABS/PC | ABS/polycarbonate resin alloy | Mitsubishi Rayon | Dialloy TS 6 |
| PP | Polypropylene-based resin | Mitsubishi Chemical | Modik P300S |
| PPE | Modified polyphenylene ether resin | Mitsubishi Chemical | Remalloy B60HT |
| PA | Nylon-based resin | Toray | Amylan CM1017 |

TABLE 4

| N-acylsarcosinic acid amount (parts) | Particle size of rubber-containing polymer (II) (μm) |
|---|---|
| 0.1 | 0.35 |
| 0.8 | 0.25 |
| 1.5 | 0.12 |

TABLE 5

| Type of thermoplastic polymer (III) | Composition | Reduced viscosity (L/g) |
|---|---|---|
| A | MMA/MA = 98/2 | 0.06 |
| B | MMA/MA = 90/10 | 0.06 |
| C | MMA/CHMI = 85/15 | 0.06 |
| D | MMA/MA = 87/13 | 0.05 |
| E | MMA/MA = 90/10 | 0.04 |

TABLE 6

Heating test results

| | 80° C. | 100° C. | 110° C. |
|---|---|---|---|
| Example 2 | ○ | ○ | x |
| Example 16 | ○ | x | x |
| Example 17 | ○ | ○ | ○ |
| Example 18 | x | x | x |

TABLE 7

Weatherability test results (ΔE)

| | After 100 hours | After 150 hours | After 200 hours |
|---|---|---|---|
| Example 3 | 13.5 | 17.2 | 31.4 |
| Example 24 | 0.3 | 3.2 | 12.5 |
| Example 25 | 0.3 | 1.3 | 11.2 |
| Example 26 | 0.2 | 0.2 | 0.5 |
| Example 27 | 5.2 | 10.8 | 21.2 |

It is claimed:

1. An acrylic film with a thickness of 100 μm to 300 μm for acrylic-laminated injection molded articles, which comprises 0–10 parts by weight of a thermoplastic polymer (I), 5.5–25 parts by weight of a rubber-containing polymer (II) and 65–94.5 parts by weight of a thermoplastic polymer (III), which are described below, wherein the total of the components (I), (II) and (III) is 100 parts by weight, and the proportion of elastic copolymer in the rubber-containing polymer (II) is 5–18 wt % of the total of components (I), (II) and (III); wherein a thermoplastic polymer (I) obtained by polymerizing 50–100 wt % of methyl methacrylate and 0–50 wt % of at least one other vinyl monomer which is copolymerizable therewith, wherein the reduced viscosity of the polymer, when measured at 25° C. with 0.1 g of the polymer dissolved in 100 mL of chloroform, is 2.0 L/g to 2.0 L/g; a rubber-containing polymer (II) which is a polymer wherein 10–400 parts by weight of a monomer or monomer mixture comprising 50–100 wt % of a methacrylic acid ester and 0–50 wt % of a vinyl monomer which is copolymerizable therewith is linked with 100 parts of an elastic polymer comprising 50–99.9 wt % of an alkyl acrylate, 0–49.9 wt % of another copolymerizable vinyl monomer and 0.1–10 wt % of a copolymerizable crosslinkable monomer, and which has a particle size of 0.2 μm–0.4 μm, and a thermoplastic polymer (III) obtained by polymerizing 50–100 wt % of a $C_1$–$C_4$ alkyl methacrylate, 0–50 wt % of an alkyl acrylate, and 0–49 wt % of at least one other vinyl monomer which is copolymerizable therewith, and having a reduced viscosity, when measured at 25° C. with 0.1 g of the polymer dissolved in 100 mL of chloroform, of 0.05 L/g to 0.1 L/g.

2. An acrylic film according to claim 1, which has a pencil hardness of H to 2H.

3. An acrylic film according to claim 1, wherein the content of the thermoplastic polymer (I) is 0.1 to 10 parts by weight.

4. An acrylic film according to claim 1, which contains an ultraviolet absorber in an amount of 0.1–5 wt %.

5. An acrylic film according to claim 4, wherein the ultraviolet absorber has a molecular weight of at least 300.

6. An acrylic film according to claim 4, wherein the ultraviolet absorber is a benzotriazole compound with a molecular weight of at least 400.

7. An acrylic film according to claim 4, wherein the ultraviolet absorber is triazine compound with a molecular weight of at least 400.

8. An acrylic film according to claim 1, wherein the deflection temperature, as measured in accordance with ASTM D648 is at least 80° C.

9. An acrylic film according to claim 1, wherein the deflection temperature, as measured in accordance with ASTM D648 is at least 100° C.

10. An acrylic film according to claim 1, wherein the deflection temperature as measured in accordance with ASTM D648 is at least 110° C.

11. An acrylic film according to claim 1, wherein the molten thermoplastic resin mixture is cooled to a solid by contact with only one metal roll at a time instead of being inserted between two metal rolls and undergoing the resulting thickness restriction and surface transfer.

12. An acrylic-laminated injection molded article of a base resin, said base resin being adhesively laminated with an acrylic film according to claim 1.

13. A molded article according to claim 12, obtained by subjecting the acrylic film to vacuum molding or air-pressure molding in an injection mold, followed by injection molding the base resin.

14. A molded article according to claim 12, wherein the base resin comprising the injection molded article is an ABS resin, a polycarbonate resin or a mixture of said resins.

15. A molded article according to claim 12, obtained by subjecting the acrylic film to printing on one side, and then laminating the base resin on the printed side.

16. An acrylic film according to claim 1, wherein the vinyl monomer of thermoplastic polymer (I) is an alkyl acrylate, an alkyl methacrylate, an aromatic vinyl compound or an acrylonitrile, the vinyl monomer of ruber-containing polymer (II) is an alkyl acrylate, cyclohexyl acrylate, styrene or acrylonitrile, and the vinyl monomer of the thermoplastic polymer (III) is an alkyl acrylate, cyclohexyl acrylate, styrene, acrylonitrile, maleic anhydride or a maleimide.

* * * * *

UNITED STATES PATENT AND TRADEMARK OFFICE
CERTIFICATE OF CORRECTION

PATENT NO. : 5,804,287
DATED : September 8, 1998
INVENTOR(S) : Hiroki Hatakeyama et al.

It is certified that error appears in the above-identified patent and that said Letters Patent is hereby corrected as shown below:

<u>Title page,</u>
Item [87], PCT Pub. Date:, should read:
-- PCT Pub. Date: Oct. 3, 1996 --

Signed and Sealed this

Twelfth Day of April, 2005

JON W. DUDAS
*Director of the United States Patent and Trademark Office*